(12) United States Patent
Sarsen et al.

(10) Patent No.: US 9,091,190 B2
(45) Date of Patent: Jul. 28, 2015

(54) ACCUMULATED ASH CORRECTION DURING SOOT MASS ESTIMATION IN A VEHICLE EXHAUST AFTERTREATMENT DEVICE

(75) Inventors: Douglas Christopher Sarsen, Howell, MI (US); Christopher Whitt, Howell, MI (US); Christopher C. Swoish, Lapeer, MI (US); Rebecca J. Darr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 13/563,841

(22) Filed: Aug. 1, 2012

(65) Prior Publication Data

US 2014/0033679 A1 Feb. 6, 2014

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 9/00* | (2006.01) |
| *F02D 41/02* | (2006.01) |
| *F02D 41/14* | (2006.01) |

(52) U.S. Cl.
CPC ............... *F01N 9/002* (2013.01); *F01N 9/005* (2013.01); *F02D 41/029* (2013.01); *F02D 41/1448* (2013.01); *F01N 2560/08* (2013.01); *F01N 2900/0412* (2013.01); *F01N 2900/1606* (2013.01); *F02D 41/1467* (2013.01); *F02D 2200/0812* (2013.01); *Y02T 10/47* (2013.01)

(58) Field of Classification Search
USPC ..................... 60/274, 277, 286, 295, 297, 311
See application file for complete search history.

(56) References Cited

U.S. PATENT DOCUMENTS

| | | | |
|---|---|---|---|
| 6,405,528 B1 | 6/2002 | Christen et al. | |
| 6,622,480 B2 | 9/2003 | Tashiro et al. | |
| 6,854,265 B2 * | 2/2005 | Saito et al. ...................... | 60/295 |
| 7,069,721 B2 * | 7/2006 | Gotou ............................. | 60/297 |
| 7,607,295 B2 * | 10/2009 | Yokoyama et al. ............. | 60/297 |
| 7,721,528 B2 * | 5/2010 | Odajima et al. ................ | 60/277 |
| 7,797,926 B2 * | 9/2010 | Nishino et al. ................. | 60/277 |
| 8,384,397 B2 * | 2/2013 | Bromberg et al. ............. | 324/636 |
| 8,413,429 B2 * | 4/2013 | Gioannini et al. ............. | 60/295 |
| 2003/0131592 A1 * | 7/2003 | Saito et al. ...................... | 60/295 |
| 2005/0166582 A1 * | 8/2005 | Gotou ............................. | 60/297 |

(Continued)

FOREIGN PATENT DOCUMENTS

| | | |
|---|---|---|
| DE | 10154261 A1 | 6/2002 |
| DE | 60219522 T2 | 12/2007 |
| DE | 102008054491 A1 | 6/2009 |

*Primary Examiner* — Audrey K Bradley
*Assistant Examiner* — Dapinder Singh
(74) *Attorney, Agent, or Firm* — Quinn Law Group, PLLC

(57) ABSTRACT

A method of correcting a soot mass estimate in a vehicle exhaust aftertreatment device includes monitoring an exhaust gas pressure drop across a particulate filter included with the vehicle exhaust aftertreatment device. Following the detection of a pressure drop, a controller may determine a soot mass estimate from the monitored pressure drop; determine an ash volume estimate representative of an amount of ash within the particulate filter; determine an ash correction factor from the soot mass estimate and the ash volume estimate; and calculate a corrected soot mass value by multiplying the ash correction factor with the soot mass estimate. If the corrected soot mass value exceeds a threshold, the controller may generate a corresponding particulate filter regeneration request.

14 Claims, 1 Drawing Sheet

(56) References Cited

U.S. PATENT DOCUMENTS

| | | | |
|---|---|---|---|
| 2006/0191258 A1* | 8/2006 | Opris | 60/297 |
| 2006/0196167 A1* | 9/2006 | Odajima et al. | 60/277 |
| 2007/0006577 A1* | 1/2007 | Yokoyama et al. | 60/297 |
| 2007/0251214 A1* | 11/2007 | Nishino et al. | 60/277 |
| 2007/0289293 A1* | 12/2007 | Kerchner et al. | 60/295 |
| 2009/0044515 A1* | 2/2009 | Lu et al. | 60/277 |
| 2009/0320452 A1* | 12/2009 | Gioannini et al. | 60/277 |
| 2010/0242443 A1* | 9/2010 | Kodama et al. | 60/277 |
| 2013/0000274 A1* | 1/2013 | Nair et al. | 60/274 |
| 2013/0000282 A1* | 1/2013 | Takayanagi et al. | 60/295 |

* cited by examiner

ACCUMULATED ASH CORRECTION DURING SOOT MASS ESTIMATION IN A VEHICLE EXHAUST AFTERTREATMENT DEVICE

TECHNICAL FIELD

The present invention relates to a method of monitoring a particulate filter in an exhaust gas aftertreatment system using a differential pressure module.

BACKGROUND

Various exhaust aftertreatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An aftertreatment system for a modern diesel engine exhaust typically incorporates a diesel particulate filter (DPF) for collecting and disposing of the sooty particulate matter emitted by the diesel engine prior to the exhaust gas being discharged to the atmosphere. A typical DPF acts as a trap for removing the particulate matter from the exhaust stream. The DPF may contain precious metals, such as platinum and/or palladium, which serve as catalysts to further oxidize soot and hydrocarbons present in the exhaust stream. In many instances, the DPF may be regenerated or cleaned using superheated exhaust gas to burn off the collected particulate.

The particulate matter included in the engine exhaust gasses may include carbonaceous soot particulates that may be oxidized to produce gaseous carbon dioxide, as well as other non-combustible particulates (i.e., ash) that are not capable of being oxidized. The composition and morphology of exhaust gasses is largely a function of the fuel, engine type, engine design, engine operation and control methodology, environmental operating conditions, and other factors. For example, engine lubricating oil that passes into the combustion chamber and is partially burned produces the majority of ash. As a further example, combustion in gasoline engines may produce submicron organic matter (OM), as well as sulfates and elemental silicon, iron, zinc, or sulfur. The elemental silicon, iron, and zinc are non-combustible particulates and may comprise ash. As another example, combustion in diesel engines may also produce OM, sulfates and elemental silicon, iron, zinc or sulfur, as well as soot and ammonium.

SUMMARY

A vehicle may include an engine and an exhaust aftertreatment device in fluid communication with the engine. The exhaust aftertreatment device may include a particulate filter for separating soot from combustion gasses exhausted from the engine.

A system for monitoring the particulate filter of the exhaust aftertreatment device includes a first fluid tube, a second fluid tube, a differential pressure module and a controller. The first fluid tube may be disposed in fluid communication with the exhaust aftertreatment device between the particulate filter and the engine. The second fluid tube may be disposed in fluid communication with the exhaust aftertreatment device and on an opposite side of the particulate filter from the first fluid tube. As such, the first fluid tube may be "upstream" of the particulate filter, and the second fluid tube may be "downstream" of the particulate filter.

A differential pressure module may be in communication with a controller, and may be configured to monitor a pressure difference between the first fluid tube and the second fluid tube. The differential pressure module may be configured to generate a delta pressure signal corresponding to the monitored exhaust gas pressure drop.

The controller may be in communication with the differential pressure module and may be configured to receive the delta pressure signal from the differential pressure module and determine a soot mass estimate from the received delta pressure signal. Additionally, the controller may determine an ash volume estimate representative of an amount of ash within the particulate filter, determine an ash correction factor from the soot mass estimate and the ash volume estimate, and calculate a corrected soot mass value by multiplying the ash correction factor with the soot mass estimate. If the corrected soot mass value exceeds a threshold, the controller may generate a regeneration request to queue a regeneration of the particulate filter.

In one configuration, the ash correction factor may be a numeric value less than 1.0, and may scale the soot mass estimate to account for ash accumulation. The controller may include a two-dimensional look-up table expressing the ash correction factor as a function of both the soot mass estimate and the ash volume estimate. The controller may then be configured to determine an ash correction factor by selecting an ash correction factor from the two-dimensional look-up table. As such, the ash correction factor may decrease as the soot mass estimate increases, for a fixed ash volume estimate.

Likewise, a method of correcting a soot mass estimate in a vehicle exhaust aftertreatment device includes: monitoring an exhaust gas pressure drop across a particulate filter included with the vehicle exhaust aftertreatment device; determining a soot mass estimate from a monitored exhaust gas pressure drop; determining an ash volume estimate representative of an amount of ash within the particulate filter; determining an ash correction factor from the soot mass estimate and the ash volume estimate; calculating a corrected soot mass value by multiplying the ash correction factor with the soot mass estimate; and generating a particulate filter regeneration request if the corrected soot mass value exceeds a threshold.

The above features and advantages and other features and advantages of the present invention are readily apparent from the following detailed description of the best modes for carrying out the invention when taken in connection with the accompanying drawings.

DETAILED DESCRIPTION

Figure 1:
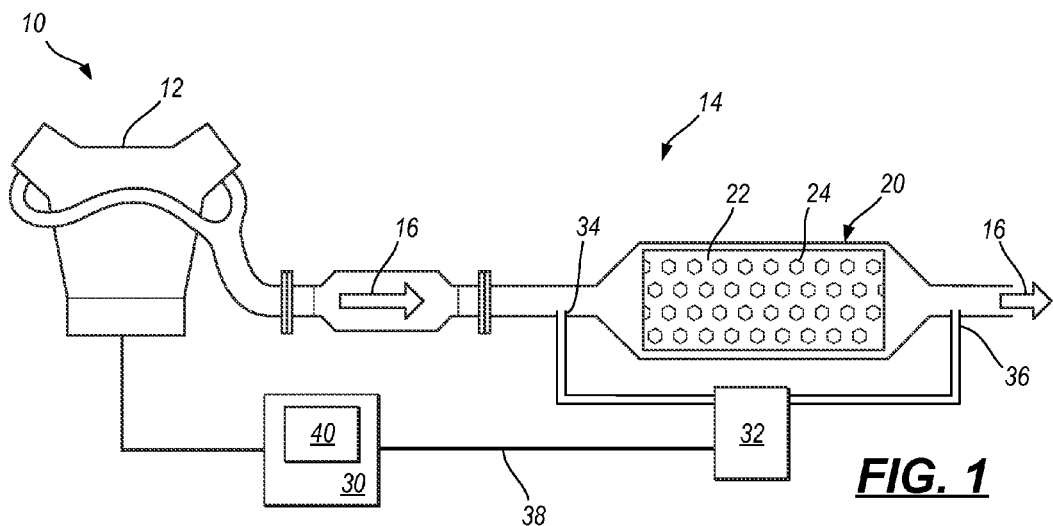
FIG. 1 is a schematic diagram of an engine and an exhaust gas aftertreatment system for treating exhaust gas from the engine.

Referring to the drawings, wherein like reference numerals are used to identify like or identical components in the various views, FIG. 1 schematically illustrates a vehicle 10, including an engine 12 and an exhaust gas aftertreatment system 14. As may be appreciated, the engine 12 may combust a mixture of fuel and air to provide a motive force for the vehicle 10. The exhaust gas aftertreatment system 14 may then direct and treat the byproducts of the combustion (i.e., exhaust gasses) as they flow from the engine 12 (indicated by flow arrows 16). In general, the exhaust gas aftertreatment system 14 may remove suspended particulate matter and NOx gasses from the exhaust flow 16 prior to the gas being expelled from the vehicle 10. In one configuration, the engine 12 may be a compression-ignited diesel engine; however, other types of engine technology may similarly be used.

The exhaust gas aftertreatment system 14 may generally include a particulate filter 20 that may be configured to filter the particulate matter, i.e., soot, from the exhaust gas of the engine 12. The particulate filter 20 may include one or more substrates 22 that define a plurality of apertures 24, through which the exhaust gas must flow. As the exhaust gas passes through the particulate filter 20, suspended airborne particulate matter may collect on the substrates 22, where it may be separated from the flow 16.

Over the life of the vehicle 10, the particulate filter 20 may occasionally need to be regenerated to remove any collected particulate matter. In one configuration, regeneration of the particulate filter 20 may include heating the particulate filter 20 to a temperature sufficient to burn the particulate matter off of the substrate 22. This high temperature may then be maintained for a period of time sufficient to burn off a majority of the particulate matter from the substrate 22. In general, the process of "burning off" the particulate matter may involve converting the sooty trapped particulate matter into carbon dioxide, which may be more permissibly dissipated into the atmosphere.

To determine when a particulate filter 20 regeneration event is required, a controller 30 may monitor an exhaust flow impedance of the particulate filter 20 via a differential pressure sensor module 32 disposed across the particulate filter 20. The differential pressure sensor module 32 may monitor a pressure drop across the substrate 22 and between a first fluid tube 34 in fluid communication with the aftertreatment system 14 at a location upstream of the filter 20 (i.e., between the filter 20 and the engine 12) and a second fluid tube 36 in fluid communication with the aftertreatment system 14 at a location downstream of the filter 20 (i.e., on an opposite side of the particulate filter 20 from the first fluid tube 34). In another configuration, one or more electronic pressure sensors may be used to determine the pressure drop across the particulate filter 20. The electronic pressure sensor may include a piezoresistive sensor, a piezoelectric sensor, a MEMS sensor, and/or a capacitive sensor configured to convert a sensed pressure into an analog or digital signal representative of the sensed pressure. The differential pressure module 32 may detect a pressure drop between the respective first and second fluid tubes 34, 36, and may provide a signal 38 (i.e., the delta pressure signal 38) to the controller 30 that is indicative of the magnitude of the difference.

In general, the controller 30 may use the sensed pressure drop, as measured by the differential pressure module 32, along with any available estimates of exhaust gas flow rate, as inputs into a soot model 40 to estimate the status of the particulate filter 20. As will be described in greater detail below, the soot model 40 may use the sensed pressure drop across the particulate filter to estimate the number of grams of soot collected within the particulate filter 20.

When the soot model 40 estimates that the particulate filter 20 requires regeneration (i.e., the amount of estimated soot exceeds a soot threshold), the controller 30 may adjust the operation of the engine 12 to perform a regeneration. In one configuration, the controller 30 may initiate a filter regeneration event by increasing the amount of fuel provided to the engine until the fuel/air ratio is slightly rich of a stoichiometric balance.

The controller 30 may include a computer and/or processor, and include all software, hardware, memory, algorithms, connections, sensors, etc., necessary to monitor and control the exhaust gas aftertreatment system 14, engine 12, and/or the differential pressure module 32. As such, a control method operative to evaluate the soot model 40 and/or to initiate a regeneration may be embodied as software or firmware associated with the controller 30. It should be appreciated that the controller 30 may also include any device capable of analyzing data from various sensors, comparing data, making the necessary decisions required to control the exhaust gas aftertreatment system 14, as well as monitoring the differential pressure sensor module 32.

Figure 2:
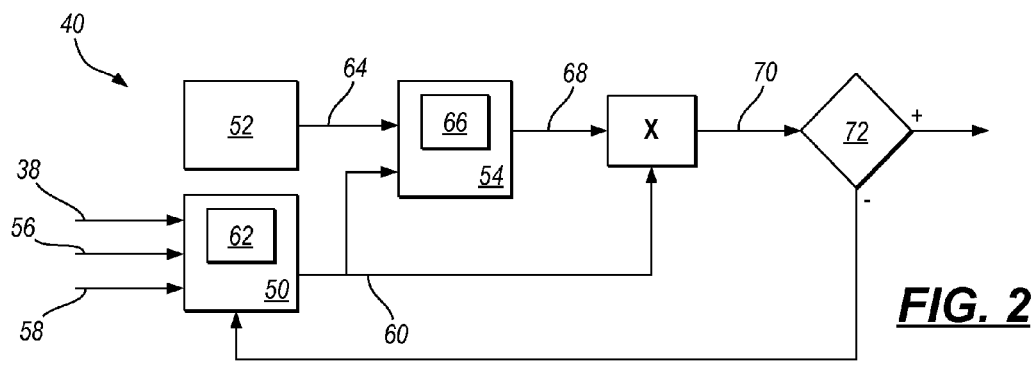
FIG. 2 is a schematic diagram of a soot model including a soot estimator, an ash estimator, and an ash correction map.

FIG. 2 schematically represents one configuration of a soot model 40. The soot model 40 may include a soot estimator 50, an ash estimator 52, and an ash correction map 54. The soot estimator 50 may receive various inputs, such as an exhaust temperature 56, an exhaust flow rate 58, and/or a differential pressure reading/signal 38, and may generate an output estimate 60 of collected soot mass within the particulate filter 20 (i.e., the "soot mass estimate 60") according to techniques known in the art. In one configuration, the soot estimator 50 may include a multi-dimensional look-up table 62 that may provide the soot mass estimate 60 as a function of the various sensory inputs 38, 56, 58. The look-up table 62 may be populated using numeric data obtained either through empirical testing or through analytic formulation. In general the soot mass estimate 60 may be an increasing function of the differential pressure reading 38, though may also be affected to a lesser degree by temperature 56 and/or flow rate 58. In one configuration, the soot mass estimate 60 may be a value expressed in grams of soot.

The ash estimator 52 may estimate the total amount of ash within the particulate filter 20 based on engine operating parameters and/or other diagnostic algorithms. The ash estimator 52 may then add the real-time estimate to a running ash volume estimate 64, which may be output to the ash correction map 54. Because ash may not be burned off during a regeneration, the ash volume estimate 64 may be maintained for the life of the particulate filter 20 and/or may only be reset when the filter is replaced or manually cleaned.

The ash correction map 54 may include a two-dimensional look-up table 66 that may select an ash correction factor 68 using the soot mass estimate 60, together with the ash volume estimate 64. The ash correction factor 68 may be a value less than 1.0 that corresponds to the scaled efficiency of the particulate filter 20 for a given soot/ash level. This correction factor 68 may then be multiplied with the soot mass estimate 60 to form a corrected soot mass value 70. The corrected soot mass 70 value may then be compared to a soot threshold (at 72) to determine if a regeneration is required.

Figure 3:
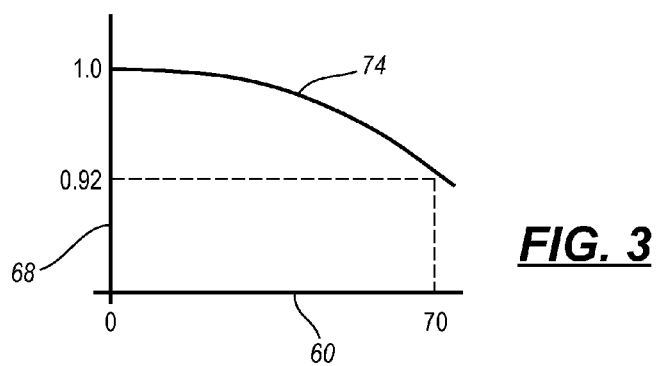
FIG. 3 is a schematic graph of an ash correction factor as a function of a soot mass estimate, for a fixed ash volume estimate.

In general, the ash correction factor 68 prevents over-regeneration of the particulate filter 20. Said another way, as ash accumulates within the particulate filter 20, it will contribute to an increased pressure drop across the filter. This increased pressure drop would ordinarily cause the aftertreatment device 14 to regenerate more frequently, since the pressure drop is the primary proxy for trapped particulate matter. If not corrected for ash accumulation, each successive regeneration would see a progressively larger decrease in efficiency (measured as soot reduction per regeneration), since ash is not burned off in the same way that soot is. By correcting for the amount of trapped ash, the efficiency of the regeneration may remain relatively constant (i.e., a roughly constant amount of soot may accumulate before a regeneration event is triggered). Furthermore, the ash correction factor 68 may be dependent on both the ash volume estimate 64 and the soot mass estimate 60 to account for the non-linearity of ash estimate as soot mass increases. FIG. 3 illustrates this non-linear relationship through a schematic graph 74 of the required ash correction factor 68 as a function of the soot mass estimate 60, at a fixed ash volume estimate 64.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of regenerating a particulate filter, the method comprising:
    monitoring, via a controller, an exhaust gas pressure drop across the particulate filter included with the vehicle exhaust aftertreatment device;
    determining, via the controller, a soot mass estimate from a monitored exhaust gas pressure drop;
    determining, via the controller, an ash volume estimate representative of an amount of ash within the particulate filter;
    determining, via the controller, an ash correction factor from the soot mass estimate and the ash volume estimate;
    calculating, via the controller, a corrected soot mass value by multiplying the ash correction factor with the soot mass estimate; and
    regenerating the particulate filter by combusting soot in the particulate filter when the corrected soot mass value exceeds a threshold.

2. The method of claim 1, wherein monitoring the exhaust gas pressure drop across a particulate filter includes:
    obtaining a first pressure reading from a first fluid tube disposed in fluid communication with the exhaust aftertreatment device and between the particulate filter and an engine;
    obtaining a second pressure reading from a second fluid tube disposed in fluid communication with the exhaust aftertreatment device and on an opposite side of the particulate filter from the first fluid tube;
    determining a difference between the first pressure reading and the second pressure reading.

3. The method of claim 1, wherein the ash correction factor is a numeric value less than 1.0.

4. The method of claim 1, wherein determining an ash correction factor includes selecting an ash correction factor from a look-up table, the look-up table being a two-dimensional look-up table expressing the ash correction factor as a function of the soot mass estimate and the ash volume estimate.

5. The method of claim 1, wherein the ash correction factor decreases with an increase in the soot mass estimate for a fixed ash volume estimate.

6. The method of claim 1, wherein regenerating the particulate filter includes increasing an amount of fuel provided to an engine coupled with the exhaust aftertreatment device.

7. A system for monitoring a particulate filter of an exhaust aftertreatment device in fluid communication with an engine of a vehicle, the system comprising:
    a first fluid tube disposed in fluid communication with the exhaust aftertreatment device and between the particulate filter and the engine;
    a second fluid tube disposed in fluid communication with the exhaust aftertreatment device and on an opposite side of the particulate filter from the first fluid tube;
    a differential pressure module in communication with the first fluid tube and the second fluid tube and configured generate a delta pressure signal corresponding to a pressure drop between the first fluid tube and the second fluid tube; and
    a controller in communication with the differential pressure module and configured to:
        receive the delta pressure signal from the differential pressure module;
        determine a soot mass estimate from the received delta pressure signal;
        determine an ash volume estimate that is representative of an amount of ash within the particulate filter;
        determine an ash correction factor from the soot mass estimate and the ash volume estimate;
        calculate a corrected soot mass value by multiplying the ash correction factor with the soot mass estimate; and
        generate a regeneration request if the corrected soot mass value exceeds a threshold.

8. The system of claim 7, wherein the ash correction factor is a numeric value less than 1.0.

9. The system of claim 7, wherein the controller includes a two-dimensional look-up table expressing the ash correction factor as a function of the soot mass estimate and the ash volume estimate; and
    wherein the controller is configured to determine an ash correction factor by selecting an ash correction factor from the two-dimensional look-up table.

10. The system of claim 7, wherein the ash correction factor decreases with an increase in the soot mass estimate for a fixed ash volume estimate.

11. A method of regenerating a particulate filter, the method comprising:
    obtaining a first pressure reading from a first fluid tube disposed in fluid communication with an exhaust aftertreatment device and between the particulate filter and an engine;
    obtaining a second pressure reading from a second fluid tube disposed in fluid communication with the exhaust aftertreatment device and on an opposite side of the particulate filter from the first fluid tube;
    determining, via a controller, an exhaust gas pressure drop across the particulate filter from the first pressure reading and the second pressure reading;
    determining, via the controller, a soot mass estimate from the determined exhaust gas pressure drop;
    determining, via the controller, an ash volume estimate representative of an amount of ash within the particulate filter;
    determining, via the controller, an ash correction factor from the soot mass estimate and from the ash volume estimate, the ash correction factor being a value less than 1.0;
    calculating, via the controller, a corrected soot mass value by multiplying the ash correction factor with the soot mass estimate; and
    regenerating the particulate filter by combusting soot in the particulate filter when the corrected soot mass value exceeds a threshold.

12. The method of claim 11, wherein determining an ash correction factor includes selecting an ash correction factor from a look-up table, the look-up table being a two-dimensional look-up table expressing the ash correction factor as a function of the soot mass estimate and the ash volume estimate.

13. The method of claim 11, wherein the ash correction factor decreases with an increase in the soot mass estimate for a fixed ash volume estimate.

14. The method of claim 11, wherein regenerating the particulate filter includes increasing an amount of fuel provided to an engine coupled with the exhaust aftertreatment device.

* * * * *